(12) United States Patent
Zeller

(10) Patent No.: US 12,290,786 B2
(45) Date of Patent: May 6, 2025

(54) COMPOSITE NANOPOROUS METAL MEMBRANE

(71) Applicant: ENTEGRIS, INC., Billerica, MA (US)

(72) Inventor: Robert Zeller, Boston, MA (US)

(73) Assignee: ENTEGRIS, INC., Billerica, MA (US)

( * ) Notice: Subject to any disclaimer, the term of this patent is extended or adjusted under 35 U.S.C. 154(b) by 56 days.

(21) Appl. No.: 18/367,969

(22) Filed: Sep. 13, 2023

(65) Prior Publication Data

US 2024/0001307 A1 Jan. 4, 2024

Related U.S. Application Data

(62) Division of application No. 16/691,226, filed on Nov. 21, 2019, now abandoned.

(60) Provisional application No. 62/779,610, filed on Dec. 14, 2018.

(51) Int. Cl.
*B01D 67/00* (2006.01)
*B01D 69/12* (2006.01)
*B01D 71/02* (2006.01)

(52) U.S. Cl.
CPC .... *B01D 67/00411* (2022.08); *B01D 67/0069* (2013.01); *B01D 69/1216* (2022.08); *B01D 71/02232* (2022.08); *B01D 2257/504* (2013.01); *B01D 2325/0283* (2022.08); *B01D 2325/20* (2013.01)

(58) Field of Classification Search
None
See application file for complete search history.

(56) References Cited

U.S. PATENT DOCUMENTS

| 5,342,431 A | 8/1994 | Anderson et al. |
| 5,364,586 A | 11/1994 | Trusov et al. |
| 6,916,454 B2 | 7/2005 | Alvin |

(Continued)

FOREIGN PATENT DOCUMENTS

| CN | 101108312 A | 1/2008 |
| CN | 101249389 B | 6/2010 |

(Continued)

OTHER PUBLICATIONS

Zhu et al, "Short Review on Porous Metal Membranes—Fabrication, Commercial Products, and Applications," Membranes 2018, 8, 83; doi:10.3390/membranes8030083 (Year: 2018).*

*Primary Examiner* — Krishnan S Menon

(57) ABSTRACT

A composite nanoporous metal membrane, a method of making same, and a method of using same to filter supercritical $CO_2$ are provided. The method of making generally includes a) providing a sintered coarse porous layer; b) applying to an outer face of the coarse porous layer second metal particles; c) sintering to form a structure comprising coarse and intermediate layers; d) applying a suspension of third metal particles; e) drying the suspension of third particles; f) pressing the dried layer of third particles; and g) sintering to form a composite nanoporous metal membrane. The composite nanoporous metal membrane generally includes: a) a sintered coarse layer; b) an intermediate layer comprising first metal particles and second metal particles joined in a sintered structure which is sintered to the coarse layer; and c) a fine layer comprising third metal particles joined in a sintered structure which is sintered to the intermediate layer.

9 Claims, 3 Drawing Sheets

(56) References Cited

U.S. PATENT DOCUMENTS

| | | |
|---|---|---|
| 7,112,237 B2 | 9/2006 | Zeller et al. |
| 7,524,361 B2 | 4/2009 | Park et al. |
| 8,932,381 B2 | 1/2015 | Zeller |
| 9,149,750 B2 | 10/2015 | Steele et al. |
| 2002/0141920 A1 | 10/2002 | Alvin et al. |
| 2004/0050773 A1 | 3/2004 | Neumann et al. |
| 2006/0175256 A1 | 8/2006 | Masten et al. |
| 2008/0081007 A1 | 4/2008 | Steele et al. |
| 2008/0149571 A1 | 6/2008 | Zeller et al. |
| 2012/0079940 A1 | 4/2012 | Zeller |
| 2013/0305673 A1 | 11/2013 | Zeller |
| 2014/0209533 A1 | 7/2014 | Matviychuk et al. |

FOREIGN PATENT DOCUMENTS

| | | |
|---|---|---|
| CN | 108144457 A | 6/2018 |
| CN | 212369940 U | 1/2021 |
| JP | 2004136279 A | 5/2004 |
| JP | 2004275858 A | 10/2004 |
| JP | 2005290170 A | 10/2005 |
| KR | 20080093776 A | 10/2008 |
| WO | 2006034717 A1 | 4/2006 |

\* cited by examiner

US 12,290,786 B2

COMPOSITE NANOPOROUS METAL MEMBRANE

BENEFIT CLAIM

This non-provisional application is a divisional under 35 U.S.C. § 120 of U.S. patent application Ser. No. 16/691,226 filed on Nov. 21, 2019, and entitled "COMPOSITE NANOPOROUS METAL MEMBRANE," which claims the benefit of U.S. Application No. 62/779,610 filed on Dec. 14, 2018, all of which are hereby incorporated by reference in their entirety.

FIELD OF THE DISCLOSURE

This disclosure relates to composite nanoporous metal membranes, methods of their manufacture, and methods of filtering fluids such as supercritical carbon dioxide (CO2) using composite nanoporous metal membranes.

BACKGROUND OF THE DISCLOSURE

Carbon dioxide (CO2) exists as a supercritical fluid at temperatures and pressures above its critical temperature (31.10° C., 87.98° F., 304.25 K) and critical pressure (7.39 MPa, 72.9 atm, 1,071 psi, 73.9 bar). Supercritical carbon dioxide finds many uses in industry, including cleaning and solvent extraction applications. In some applications, supercritical carbon dioxide may be used in the electronics and semiconductor manufacturing industries, which require extremely high cleanliness and purity of materials. In one such application, supercritical carbon dioxide may be used to remove photoresist from semiconductor wafers. The purity of process fluids used in semiconductor manufacturing industries is maintained, in one aspect, by filtration to remove contaminants. However, equipment used to transport, purify, and apply supercritical carbon dioxide must be sufficiently robust to handle the temperatures and pressures required to maintain carbon dioxide in a supercritical state.

Porous materials useful as filters may be obtained by molding and sintering powders containing fibrous, dentritic, or spherical shaped precursor particles. Current high efficiency all metal gas filters are generally of 2 categories. The first are those made from fine metal powders, generally less than 20 microns and often 1 micron to 3 microns. An example is the Entegris "Wafergard® III" line of gas filters or the Mott "Gas Shield®" line of filters. The second are filters made from small diameter metal fibers—fibers with diameters of 5 micron or less. Examples of this are the Pall "Gaskleen®" line of filters and Mott "Defender" filters.

Currently available filters sufficiently robust for use with supercritical CO2 include the Entegris "Wafergard® SC" line of filters. FIG. 3 is a graph that includes data for four "Wafergard® SC" filters of varying nominal pore size (labeled "Comparatives A-D"). FIG. 3 graphs permeability (flow per unit area) against bubble point (a measure that reflects consistently small pore size and thus greater filter selectivity). It can be seen that, among these currently available filters, there is a trade-off between these two desirable characteristics.

There exists a need for filter materials sufficiently robust for use with supercritical CO2 which can provide both increased permeability and increased bubble point.

SUMMARY OF THE DISCLOSURE

In first aspect, a method of making a composite nanoporous metal membrane comprises: a) providing a sintered coarse porous layer comprising first metal particles having an average diameter of 50-200 micrometers and a first sintering temperature; b) applying to an outer face of the coarse porous layer second metal particles having an average diameter of 1-5 micrometers and a second sintering temperature; c) sintering at a temperature less than the first sintering temperature to form a structure comprising coarse and intermediate layers; d) applying a suspension of third metal particles having an average diameter of 50-150 nanometers and a third sintering temperature; e) drying the suspension of third particles; f) pressing the third particle layer; and g) sintering at a temperature less than the second sintering temperature to form a composite nanoporous metal membrane. A second aspect according to the first aspect, wherein second particles having an average diameter of 1-4 micrometers. A third aspect according to the first or second aspect, wherein the pressing step comprises uniform orthogonal compression of the third particle layer. A fourth aspect according to any of the previous aspects wherein, the suspension of third particles is a suspension in a solvent system having a surface tension of less than 30.0 millinewtons per meter at 20° C. A fifth aspect according to any of the previous aspects wherein, the suspension of third particles is a suspension in a solvent system of one or more alcohols and/or water. A sixth aspect according to any of the previous aspects wherein, the composite nanoporous metal membrane has a bubble point of 207 kPa (30 PSI) or greater as measured by the IPA Bubble Point Test Method and an air permeability of 0.200 slpm/cm2 or greater as measured by the Air Permeability Test Method. A seventh aspect according to any of the previous aspects, wherein the composite nanoporous metal membrane has a bubble point of 380 kPa (55 PSI) or greater as measured by the IPA Bubble Point Test Method. An eighth aspect according to any of the previous aspects, wherein the composite nanoporous metal membrane comprises pores capable of passing liquids or supercritical fluids. In a ninth aspect according to any of the previous aspects, wherein the first, second, and third metals are independently selected from the group consisting of stainless steel and nickel. Additional embodiments of the present method are described herein.

In a tenth aspect a composite nanoporous metal membrane comprises: a) a sintered coarse layer comprising first metal particles, the first particles having an average diameter of 50-200 micrometers; b) an intermediate layer comprising first metal particles and second metal particles having an average diameter of 1-5 micrometers, where the first and second particles of the intermediate layer are joined in a sintered structure which is sintered to the coarse layer; and c) a fine layer comprising third metal particles having an average diameter of 50-150 nanometers, wherein the third particles of the fine layer are joined in a sintered structure which is sintered to the intermediate layer. An eleventh aspect according to the tenth aspect wherein, the composite nanoporous metal membrane has a bubble point of 207 kPa (30 PSI) or greater as measured by the IPA Bubble Point Test Method and an air permeability of 0.200 slpm/cm2 or greater as measured by the Air Permeability Test Method. A twelfth aspect according to the tenth or eleventh aspect, wherein the composite nanoporous metal membrane has a bubble point of 380 kPa (55 PSI) or greater as measured by the IPA Bubble Point Test Method. A thirteenth aspect according to any of the tenth through twelfth aspects, wherein the composite nanoporous metal membrane comprises pores capable of passing liquids or supercritical fluids. A fourteenth aspect according to any of the tenth through thirteenth aspects, wherein the first, second, and third metal particles are independently selected from the group consisting of stainless steel and nickel. A fifteenth aspect according to any of the tenth through fourteenth aspects, wherein the fine layer has a thickness of 50-250 micrometers. Additional embodiments of the composite nanoporous metal membrane of the present disclosure are described herein.

In a sixteenth aspect, a method of filtering supercritical CO2 comprises the step of passing supercritical CO2 through the composite nanoporous metal membrane according any of the tenth through fifteenth aspects. A seventeenth aspect according to the sixteenth aspect, wherein the step of passing supercritical CO2 through the composite nanoporous metal membrane can occur at pressure drop across the composite nanoporous metal membrane of greater than 2.5 MPa without degradation of the composite nanoporous metal membrane. Additional embodiments of the present method are described herein.

In an eighteenth aspect, a filter comprises the composite nanoporous metal membrane according to any of the tenth through fifteen aspects mounted in a filter housing. A nineteenth aspect according to the eighteenth aspect, wherein the filter housing comprises metal and the fine layer of the composite nanoporous metal membrane is welded to the filter housing. Additional embodiments of the filter of the present disclosure are described herein.

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:
"directly bound" refers to two materials that are in direct contact with each other and bound together; and
"metal or alloy in metallic state" includes metals in metallic state and alloys of metals in metallic state including steel, and excludes metal oxides and ceramics.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
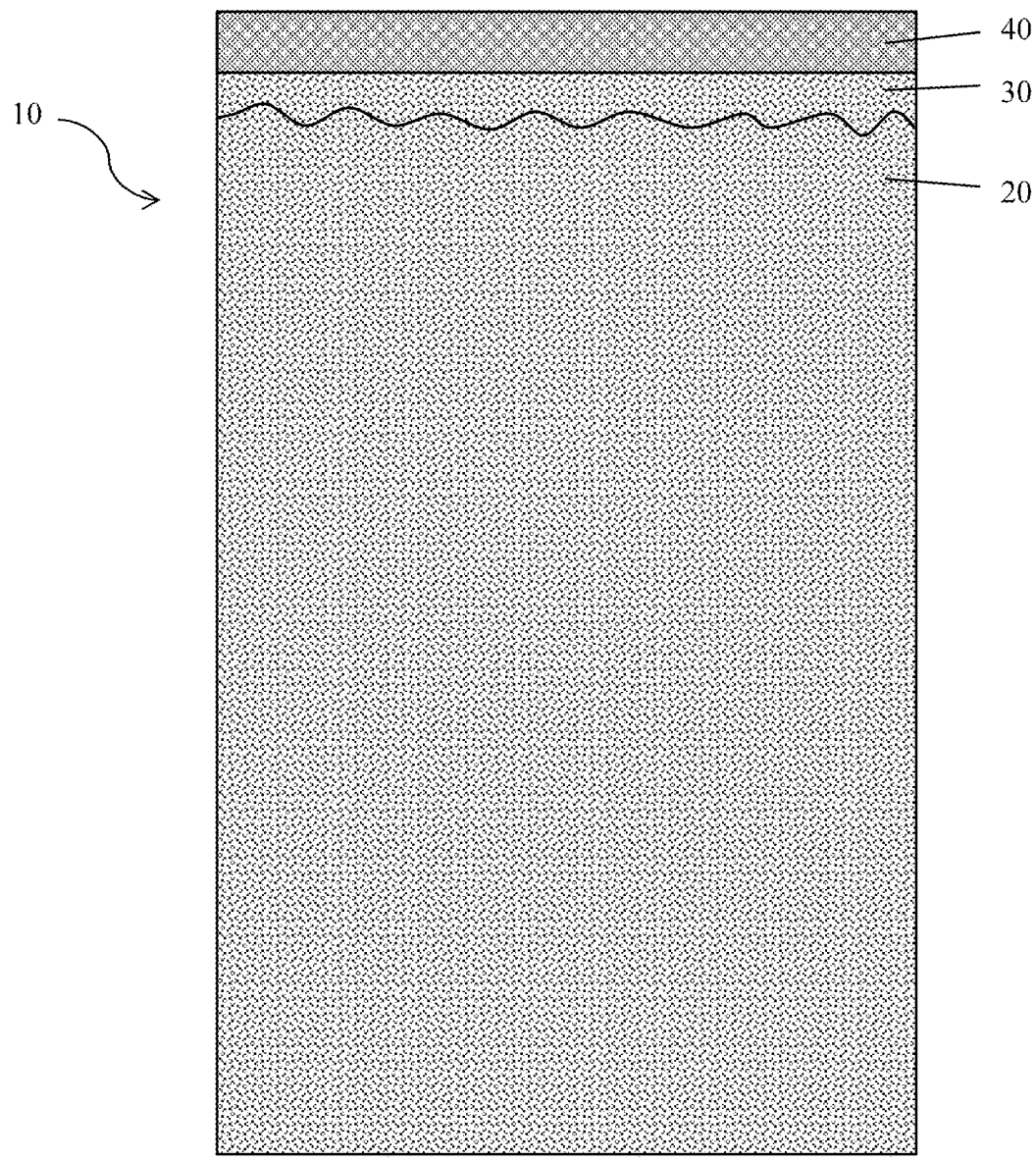
FIG. 1 represents a cross-section of an embodiment of a composite nanoporous metal membrane according to the present disclosure.

The present disclosure provides composite nanoporous metal membranes, methods of their manufacture, and methods of filtering fluids such as supercritical carbon dioxide (CO2) using composite nanoporous metal membranes. Whereas filter design typically requires a trade-off between increased permeability and increased bubble point (a measure that reflects consistently small pore size and thus greater filter selectivity), embodiments of the composite nanoporous metal membrane of the present disclosure may achieve both advantages simultaneously.

The present disclosure contemplates filtering supercritical carbon dioxide by passing it through the composite nanoporous metal membranes disclosed herein to remove suspended particles or contaminants. In some embodiments, the pressure drop (differential pressure) across the composite nanoporous metal membrane during filtration is greater than 2.5 MPa without degradation of the composite nanoporous metal membrane; in some embodiments greater than 3.0 MPa; and in some embodiments greater than 3.5 MPa. The present disclosure additionally contemplates that the methods and articles presented herein may be useful in filtration of particulates or contaminants from any suitable fluids, gasses, liquids, or supercritical fluids.

Method of Manufacturing Composite Nanoporous Metal Membranes

The present disclosure contemplates methods of manufacturing composite nanoporous metal membranes. These methods enable the formation of thin, fine-pored layers having high permeability and simultaneously high bubble point.

A coarse porous layer is first provided. The coarse porous layer is not particularly limited in its shape, so long as the shape differentiates between a first face and a second face such that fluids to be filtered pass through the membrane from the first face to the second face. In some embodiments, the coarse porous layer is substantially flat, and may have any suitable perimeter, such as a disc, a square sheet, a rectangular sheet, or other arbitrary perimeter. In some embodiments, the coarse porous layer may represent a curved surface or a section of a curved surface and again may have any suitable perimeter. In some embodiments, the coarse porous layer may represent a closed curve such as a cylinder, where a first face of the membrane is the interior surface of the cylinder and a second face is the exterior surface.

The coarse porous layer comprises a porous mass of a metal or alloy in metallic state. Typically, the average pore size is in the range of 10-100 micrometers. The coarse layer is typically a sintered mass derived from first particles having an average diameter of 50-200 micrometers and a first sintering temperature. In some embodiments, the first sintering temperature is in the range of 1150-1350° C. In some embodiments, the first particles have an aspect ratio (ratio of longest to shortest dimension) of less than four, less than three, or less than two; that is, they are not fibers.

Second particles are applied to a face of the coarse porous layer as a dry powder. When the coarse porous layer is a cylinder or other closed curve, second particles are typically applied to the external surface. Second particles comprise a second metal or alloy in metallic state, have an average diameter of 1-5 micrometers, and a second sintering temperature. In some embodiments the second sintering temperature is in the range of 1000-1100° C. The second sintering temperature is typically lower than the first sintering temperature. In various embodiments, second particles may have an average diameter of 1.0-5.0 micrometers, 1.0-4.5 micrometers, 1.0-4.0 micrometers, 1.5-5.0 micrometers, 1.5-4.5 micrometers, 1.5-4.0 micrometers, 2.0-5.0 micrometers, 2.0-4.5 micrometers, or 2.0-4.0 micrometers. In some embodiments, the second particles have an aspect ratio (ratio of longest to shortest dimension) of less than four, less than three, or less than two; that is, they are not fibers. Second particles may be encouraged into the pores of the coarse porous layer by vibration, brushing, or other mechanical means. Any excess of second particles may be removed. The coarse porous layer bearing second particles is a first intermediate structure.

The first intermediate structure may then be sintered at a temperature in excess of the second sintering temperature to form a second intermediate structure comprising coarse and intermediate layers. In some embodiments, the sintering temperature is in excess of the second sintering temperature but not in excess of the first sintering temperature.

The sintered mass of second particles forms a base for application of third particles. Typically, the sintered mass of second particles will tend to prevent third particles from entering into the interior of the coarse porous layer and allow the third particles to form a self-sintered layer on the surface of the composite nanoporous metal membranes. Typically, the second intermediate structure retains its porosity during the fabrication of the fine layer.

Third particles are applied to the second intermediate structure as a slurry or suspension. Third particles comprise a third metal or alloy in metallic state, have an average diameter of 50-150 nanometers, and a third sintering temperature. In some embodiments, the third sintering temperature is in the range of 800-900° C., and is typically lower than the first and second sintering temperatures. The third sintering temperature is typically lower than the second sintering temperature. In various embodiments, third particles may have an average diameter of 30-150 nanometers, 30-120 nanometers, 30-100 nanometers, 30-90 nanometers, 50-150 nanometers, 50-120 nanometers, 50-100 nanometers, 50-90 nanometers, 60-150 nanometers, 60-120 nanometers, 60-100 nanometers, or 60-90 nanometers. In some embodiments, the third particles have an aspect ratio (ratio of longest to shortest dimension) of less than four, less than three, or less than two; that is, they are not fibers.

The slurry or suspension of third particles is a suspension in any suitable solvent system. Typically, the solvent system is one that can evaporate readily. In some embodiments, the solvent system has a surface tension of less than 30.0 millinewtons per meter at 20° C. In some embodiments, the slurry or suspension (including particles and solvent) has a surface tension in the range of 20-50 millinewtons per meter at 20° C. In some embodiments, the solvent system comprises one or more alcohols and/or water. In some embodiments, the solvent system comprises isopropyl alcohol (IPA). In some embodiments, the slurry or suspension has sufficient viscosity to resist flow into the second intermediate structure, which may be a viscosity of 80-120 centipoise.

The slurry or suspension of third particles is thereafter dried. To accelerate drying, the second intermediate structure bearing the slurry or suspension of third particles may be heated, subjected to sub-atmospheric pressure, or combinations thereof.

After drying, the second intermediate structure bearing dried third particles is pressed to form a third intermediate structure. Typically pressing comprises uniform orthogonal compression of the third particle layer. As used herein, "uniform orthogonal compression" excludes application of shear forces or the use of rollers. Typically, uniform orthogonal compression is uniform across the entire layer of dried third particles at all times during the pressing step. Pressing is typically carried out at pressures of 50-100 megapascal (7260-14500 psi) using a press having a highly polished surface (surface roughness less than 5 Ra) on any face contacting the dried third particles. When the coarse porous layer is cylinder or other closed curve, the dried third particles may be pressed using systems known in the art wherein the cylinder is supported internally by a rod fit to the internal diameter of the cylinder and pressed from the outside by the expansion of a sleeve surrounding the cylinder. Typically pressing of the cylinder comprises uniform orthogonal compression, which is orthogonal to the outer surface of the cylinder at every point.

The dried and pressed third intermediate structure is then sintered at a temperature greater than the third sintering temperature to form a composite nanoporous metal membrane. In some embodiments, the sintering temperature is in excess of the third sintering temperature but not in excess of the first sintering temperature, the second sintering temperature, or both the first and second sintering temperatures.

The metals or alloys in metallic state comprising each of the coarse porous layer (first particles), second particles and third particles may be chosen independently. In some embodiments, the metals or alloys in metallic state comprising the coarse porous layer (first particles) and second particles are the same. In some embodiments, the metals or alloys in metallic state comprising the coarse porous layer (first particles) and third particles are the same. In some embodiments, the metals or alloys in metallic state comprising the second particles and third particles are the same. In some embodiments, the metals or alloys in metallic state comprising the coarse porous layer (first particles), second particles, and third particles are all the same. Any suitable metals or alloys in metallic state may be used. In some embodiments, the metals or alloys in metallic state are chosen from iron, nickel, chromium, molybdenum, and alloys of any of the above including alloys with carbon (i.e., steels). In some embodiments, the metals or alloys in metallic state are chosen from nickel and stainless steels. In some embodiments, the metals or alloys in metallic state are chosen from stainless steels.

Particle sizes may be measured by use of test methods such as ASTM B822-17, Standard Test Method for Particle Size Distribution of Metal Powders and Related Compounds by Light Scattering (useful for particle sizes <45 microns) or ASTM D6913/D6913M—17 Standard Test Methods for Particle-Size Distribution (Gradation) of Soils Using Sieve Analysis (useful for particle sizes >45 microns).

Composite Nanoporous Metal Membranes

The composite nanoporous metal membrane is not particularly limited in its shape, so long as the shape differentiates between a first face and a second face such that fluids to be filtered pass through the membrane from the first face to the second face. In some embodiments, the composite nanoporous metal membrane is substantially flat, and may have any suitable perimeter, such as a disc, a square sheet, a rectangular sheet, or other arbitrary perimeter. In some embodiments, the composite nanoporous metal membrane may represent a curved surface or a section of a curved surface and again may have any suitable perimeter. In some embodiments, the composite nanoporous metal membrane may represent a closed curve such as a cylinder, where a first face of the membrane is the interior surface and a second face is the exterior surface. In the case of a cylinder, the fine layer is typically borne on the exterior surface.

In some embodiments the composite nanoporous metal membrane is capable of filtering as a sieve to near single digit nanometer scale, i.e., 15 nanometers, 12 nanometers, 10 nanometers, 9 nanometers, 8 nanometers, 7 nanometers, 6 nanometers, or even 5 nanometers. In some embodiments, the composite nanoporous metal membrane achieves this high degree of filtering while maintaining permeability in the range of currently available sieve type filters having far less selectivity. In some embodiments, the composite nanoporous metal membrane has a bubble point of 207 kPa (30 PSI) or greater, 242 kPa (35 PSI) or greater, 276 kPa (40 PSI) or greater, 311 kPa (45 PSI) or greater, 345 kPa (50 PSI) or greater, 380 kPa (55 PSI) or greater, 414 kPa (60 PSI) or greater, 449 kPa (65 PSI) or greater, 483 kPa (70 PSI) or greater, or 518 kPa (75 PSI) or greater, as measured by the IPA Bubble Point Test Method described herein. In some embodiments, the composite nanoporous metal membrane has an air permeability of 0.200 slpm/cm2 or greater, 0.300 slpm/cm2 or greater, 0.400 slpm/cm2 or greater, or 0.500 slpm/cm2 or greater, as measured by the Air Permeability Test Method described herein. In some embodiments, the composite nanoporous metal membrane has simultaneously a bubble point as listed above, and an air permeability as listed above. For example, in some embodiments, the composite nanoporous metal membrane has simultaneously a bubble point of 207 kPa (30 PSI) or greater as measured by the IPA Bubble Point Test Method described herein and an air permeability of 0.200 slpm/cm2 or greater as measured by the Air Permeability Test Method described herein. In some embodiments, the composite nanoporous metal membrane has simultaneously a bubble point of 242 kPa (35 PSI) or greater as measured by the IPA Bubble Point Test Method described herein and an air permeability of 0.300 slpm/cm2 or greater as measured by the Air Permeability Test Method described herein. In some embodiments, the composite nanoporous metal membrane has simultaneously a bubble point of 276 kPa (40 PSI) or greater as measured by the IPA Bubble Point Test Method described herein and an air permeability of 0.400 slpm/cm2 or greater as measured by the Air Permeability Test Method described herein. In some embodiments, the composite nanoporous metal membrane has simultaneously a bubble point of 311 kPa (45 PSI) or greater as measured by the IPA Bubble Point Test Method described herein and an air permeability of 0.500 slpm/cm2 or greater as measured by the Air Permeability Test Method described herein. The composite nanoporous metal membrane typically comprises pores capable of passing liquids or supercritical fluids through the entire thickness of the membrane, in distinction to membranes which make use of a mechanism of molecular diffusion through a layer that is otherwise solid or non-porous.

FIG. 1 represents a cross-section a composite nanoporous metal membrane according to one embodiment of the present disclosure. Composite nanoporous metal membrane 110 includes coarse layer 120 comprising a porous mass of a metal or alloy in metallic state. Typically, the average pore size is in the range of 10-100 micrometers. Coarse layer 120 may be a sintered mass derived from first particles having an average diameter of 50-200 micrometers. Intermediate layer 130 is a sintered porous mass comprising second particles of a metal or alloy in metallic state. In various embodiments, second particles may have an average diameter of 1.0-5.0 micrometers, 1.0-4.5 micrometers, 1.0-4.0 micrometers, 1.5-5.0 micrometers, 1.5-4.5 micrometers, 1.5-4.0 micrometers, 2.0-5.0 micrometers, 2.0-4.5 micrometers, or 2.0-4.0 micrometers. Intermediate layer 130 may comprise second particles interpenetrated into the material of coarse layer 120 and sintered together and in place, second particles atop the material of coarse layer 120 and sintered together and in place, or more typically both. Intermediate layer 130 may have a thickness of 5-250 micrometers, 5-100 micrometers, micrometers, 5-20 micrometers, 10-250 micrometers, 10-100 micrometers, 10-50 micrometers, or 10-20 micrometers. Typically, coarse layer 120 and intermediate layer 130 are directly bound. Fine layer 140 is a sintered porous mass comprising third particles of a metal or alloy in metallic state. In various embodiments, third particles may have an average diameter of 30-150 nanometers, 30-120 nanometers, 30-100 nanometers, 30-90 nanometers, 50-150 nanometers, 50-120 nanometers, 50-100 nanometers, 50-90 nanometers, 60-150 nanometers, 60-120 nanometers, 60-100 nanometers, or 60-90 nanometers. Fine layer 140 may have a thickness of 50-300 micrometers, 50-250 micrometers, 50-200 micrometers, 50-150 micrometers, 70-250 micrometers, 70-200 micrometers, 70-150 micrometers, 90-250 micrometers, 90-200 micrometers, or 90-150 micrometers. In some embodiments, fine layer 140 may have a surface density of 0.03-0.07 g/cm3. Typically, intermediate layer 130 and fine layer 140 are directly bound.

The metals or alloys in metallic state comprising each of coarse layer 120, intermediate layer 130, and fine layer 140 may be chosen independently. In some embodiments, the metals or alloys in metallic state comprising coarse layer 120 and intermediate layer 130 are the same. In some embodiments, the metals or alloys in metallic state comprising coarse layer 120 and fine layer 140 are the same. In some embodiments, the metals or alloys in metallic state comprising intermediate layer 130 and fine layer 140 are the same. In some embodiments, the metals or alloys in metallic state comprising coarse layer 120, intermediate layer 130, and fine layer 140 are all the same. Any suitable metals or alloys in metallic state may be used. In some embodiments, the metals or alloys in metallic state are chosen from iron, nickel, chromium, molybdenum, and alloys of any of the above including alloys with carbon (i.e., steels). In some embodiments, the metals or alloys in metallic state are chosen from nickel and stainless steels. In some embodiments, the metals or alloys in metallic state are chosen from stainless steels.

In some embodiments, the present disclosure contemplates a filter comprising the composite nanoporous metal membrane mounted in a filter housing. Since the composite nanoporous metal membrane of the present disclosure is comprised of metals or alloys in metallic state, it may be mounted in a metal filter housing by welding. Typically, the fine layer (at least) is welded to the filter housing to prevent fluid from bypassing the fine layer. This presents an advantage over membranes having ceramic fine layers, which cannot be welded. Additionally, this enables mounting of the composite nanoporous metal membrane without need for a gasket. Typically, the filter comprises no gasket between the composite nanoporous metal membrane and the filter housing and in particular no gasket of organic material. This is particularly advantageous when the filter is used with materials that tend to attack or corrupt gasketing materials, such as supercritical carbon dioxide.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

Materials

| Designation | Description |
|---|---|
| SS frit | Disc-shaped sintered 316L stainless steel 20 micrometer frit, having a coarse structure made from 100-200 micrometer diameter stainless steel particles with a sintering temperature of 1250° C., the frit having 47.28% porosity, a diameter of 5.24 centimeters, thickness of 6.4 millimeters, mass of 58.20 grams, available from Applied Porous Technologies, Inc., Tariffville, Connecticut, USA. |
| SS micro sized powder | 316 L stainless steel powder comprising generally spherical particles having 1-10 micrometer diameter and a sintering temperature of 1000-1100° C., available from Epson Atmix Corp., Hachinoke-shi, Aomoriken, Japan. |
| SS nanopowder | 316 L stainless steel nanopowder comprising irregular but roughly spherical (not fibrous or branched) particles having an average diameter of 70 nanometers, a sintering temperature of 800-900° C., and a very high surface area of 30-50 m$^2$/g, available from American Elements, Los Angeles, CA, USA. |
| Comparative A | A comparative all-metal filter membrane having a nominal average pore size of 100 nanometers commercially available as ENTEGRIS Wafergard SC part #SI2R005E03. |
| Comparative B | A comparative all-metal filter membrane having a nominal average pore size of 65 nanometers commercially available as Entegris Wafergard SC part #SI2R065E09. |
| Comparative C | A comparative all-metal filter membrane having a nominal average pore size of 50 nanometers commercially available as Entegris Wafergard SC part #SI2R050E15. |
| Comparative D | A comparative all-metal filter membrane having a nominal average pore size of 20 nanometers commercially available as Entegris Wafergard SC part #SI2R020E16. |

Test Methods

Air Permeability Test Method

The material to be tested was fixed in an enclosing housing and air flow was controlled using a mass flow meter. The flow was adjusted until the inlet pressure (measured by a pressure gage or transducer) was at the specified value. Air flow was measured at an upstream pressure of 200 kPag (2 BARG) at 20° C. with a downstream pressure of 0 kPag (0 BARG), i.e., atmospheric pressure, over the surface of a material with a known frontal area and was expressed of units of slpm/cm2 (flow per unit area).

IPA Bubble Point Test Method

Bubble point was measured according to ASTM Standard E-128-99(2011) using isopropyl alcohol (IPA) as a test liquid. The material to be tested was completely soaked with wetting solution and then placed in a fixture which seals the circumference but leaves one surface visible and the other sealed. Air pressure was applied to the sealed side of the material. The pressure at which a bubble formed on the visible surface was recorded.

Scanning Electron Micrography Method

A composite nanoporous metal membrane was cut in cross-section and micrographs of the nanoporous cross section were taken using a scanning electron microscope (Phenom Pro/ProX tabletop SEM available from Thermo Fisher Scientific, Netherlands).

Composite Nanoporous Metal Membrane Fabrication

A SS frit was covered with SS micro sized powder. The powdered frit was lightly vibrated to allow some penetration of the SS micro sized powder into the surface pores of the SS frit and the remainder was brushed off to make a first intermediate structure. The first intermediate structure was then sintered at 1080° C. in an H2 atmosphere for 20 minutes in a Standard Industrial combo hydrogen/vacuum furnace to make a second intermediate structure.

Nanopowder slurries (suspensions) were prepared by addition of SS nanopowder to 5 ml of 100% isopropyl alcohol (IPA) followed by 5 minutes of ultrasonic mixing to break up powder. Varying masses of SS nanopowder were added to create different concentrations, as disclosed in Table 1.

TABLE 1

| Example | SS Nanopowder Concentration (g/ml) |
|---|---|
| 1 | 0.179 |
| 2 | 0.251 |
| 3 | 0.269 |
| 4 | 0.301 |
| 5 | 0.358 |
| 6 | 0.358 |
| 7 | 0.516 |

The slurries of each Example were uniformly poured onto a second intermediate structure (i.e., a SS frit with sintered layer of SS micro sized powder) and allowed to dry at room temperature until liquid was no longer observed, then placed in heating oven at 100° C. for 1 hour for further drying. These structures were then pressed at 62 megapascal (9000 psi) using a platen press having a highly polished surface (surface roughness less than 5 Ra) on the platen contacting the face bearing the dried SS nanopowder to form third intermediate structures. The press was configured so as to apply uniform orthogonal compression.

After pressing, the third intermediate structures were sintered at 825-875° C. in H2 for 30 minutes in a Standard Industrial combo hydrogen/vacuum furnace to make composite nanoporous metal membranes. A slow ramp from around 500° C. to the sintering temperature was used to reduce the possibility of warping. The resulting composite nanoporous metal membranes for each of Examples 1-7 were thus composed entirely of 316L stainless steel.

Air permeability and IPA bubble point were measured for each of the composite nanoporous metal membranes of Examples 1-7 and are reported in Table 2. Surface Densities reported in Table 2 were determined by dividing the weight increase between the second intermediate structure stage and the final composite nanoporous metal membrane stage by the surface area of the composite nanoporous metal membrane.

TABLE 2

| Example | SS Nanopowder Slurry Concentration (g/ml) | Surface Density of Sintered Nanopowder Layer (g/cm$^2$) | Air Permeability (Flow per unit area) (slpm/cm$^2$) | IPA Bubble Point (kPa (PSI)) |
|---|---|---|---|---|
| 1 | 0.179 | 0.044 | .562 | 345 (50) |
| 2 | 0.251 | 0.062 | .416 | 414 (60) |
| 3 | 0.269 | 0.064 | .295 | 483 (70) |
| 4 | 0.301 | 0.065 | .395 | 517 (75) |
| 5 | 0.358 | 0.083 | .290 | 448 (65) |
| 6 | 0.358 | 0.084 | .270 | 448 (65) |
| 7 | 0.516 | 0.096 | .208 | 552 (80) |

Figure 2:
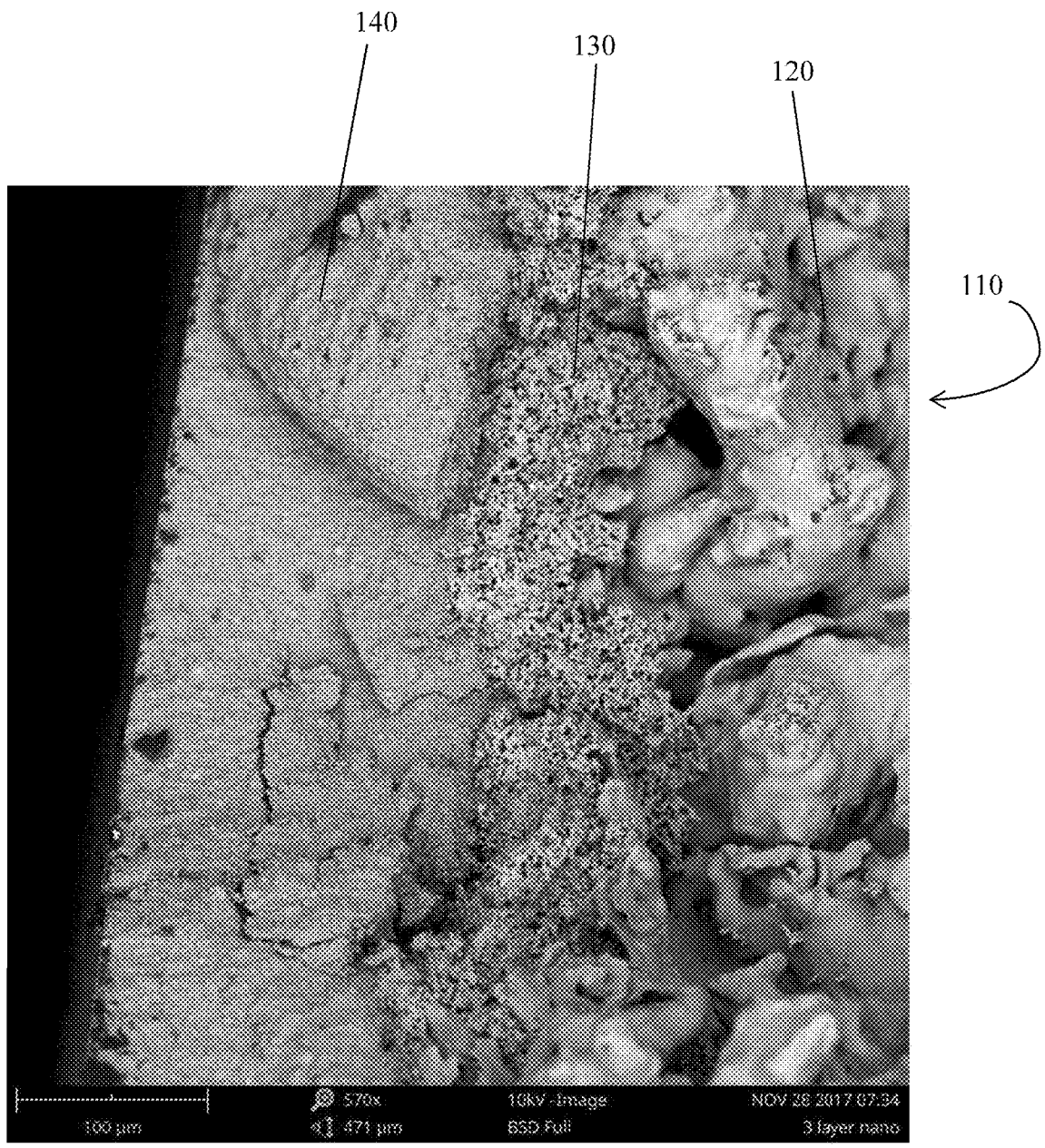
FIG. 2 is scanning electron micrograph of a cross-section of an embodiment of a composite nanoporous metal membrane according to the present disclosure, which is Example 4 herein.

FIG. 2 is a scanning electron micrograph of a cross-section the composite nanoporous metal membrane of Example 4. Composite nanoporous metal membrane 110 included coarse layer 120 comprising the SS frit; intermediate layer 130 comprising the SS micro sized powder which was partially atop and partially penetrated into the SS frit and sintered together with itself and the SS frit, and fine layer 140 comprising the SS nanopowder, where the nanopowder was joined in a sintered structure that was also sintered to intermediate layer 130. In this embodiment, the entire composite nanoporous metal membrane 110, including all three layers, comprised 316L stainless steel. With reference to the 100 micrometer scale bar, it can be seen that the thickness of fine layer 140 was 150-175 micrometers and the thickness of intermediate layer 130 was 20-50 micrometers.

Air permeability and IPA bubble point were measured for four comparative filter membranes of varying pore size. The results for these four comparative nanoporous membranes and for the composite nanoporous metal membrane of Example 1 are presented in Table 3 and represented graphically in FIG. 3, graphed as permeability (flow per unit area) vs. IPA bubble point.

TABLE 3

| Example/ Comparative | Air Permeability (Flow per unit area) (slpm/cm$^2$) | IPA Bubble Point (kPa (PSI)) |
|---|---|---|
| 1 | .562 | 345 (50) |
| A | .647 | 90 (13) |
| B | .235 | 131 (19) |
| C | .071 | 179 (26) |
| D | .015 | 345 (50) |

Figure 3:
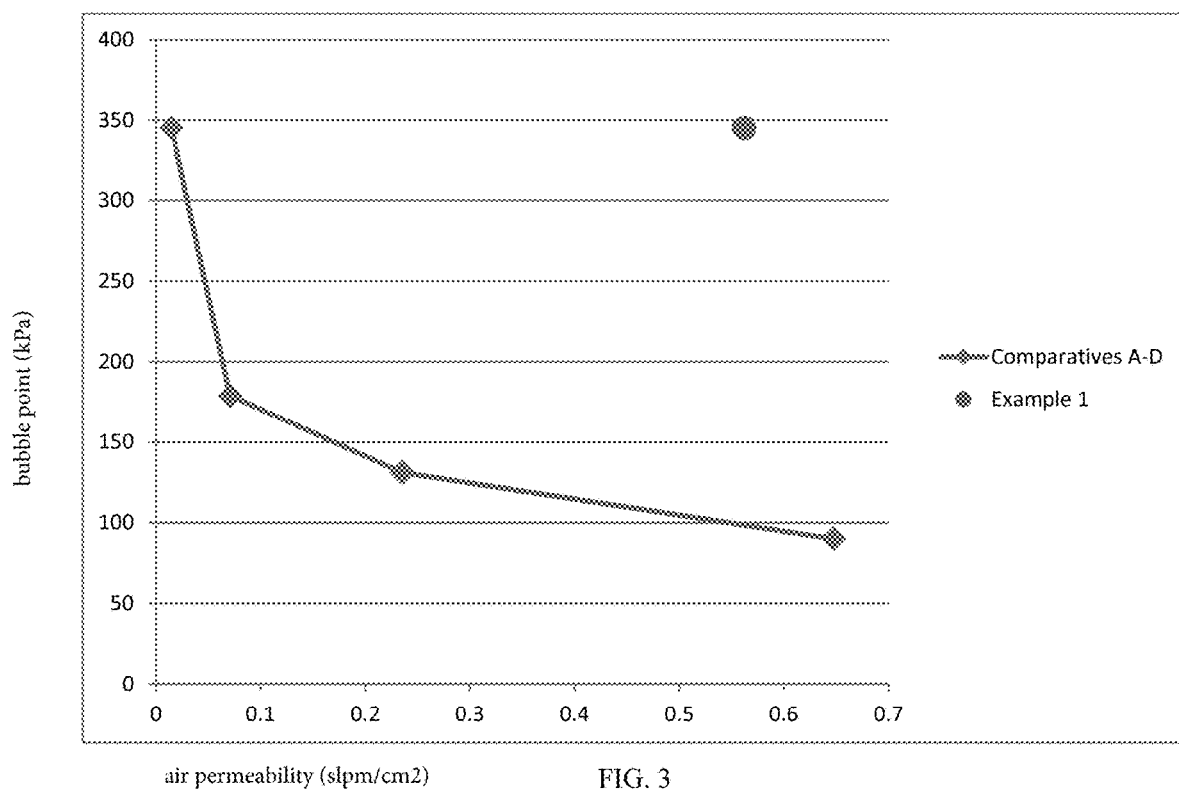
FIG. 3 is a graph of permeability (flow per unit area) vs. IPA bubble point, measured as described herein, for four comparative filter membranes and an embodiment of a composite nanoporous metal membrane according to the present disclosure, which is Example 1 herein.

It can be seen from Table 3 and FIG. 3 that, among these comparative filters, there is a trade-off between increasing permeability and increasing bubble point. It can further be seen that the composite nanoporous metal membrane of Example 1 defies this limitation and achieves both advantages simultaneously.

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. A method of making a composite nanoporous metal membrane comprising:
    a) providing a coarse porous layer comprising first particles comprising a first metal or alloy in metallic state, the first particles having an average diameter of 50-200 micrometers and a first sintering temperature, wherein the first particles of the coarse layer are joined in a sintered structure;
    b) applying, to an outer face of the coarse porous layer, second particles comprising a second metal or alloy in metallic state to form a first intermediate structure, the second particles having an average diameter of 1-5 micrometers and a second sintering temperature;
    c) sintering the first intermediate structure at a temperature less than the first sintering temperature to form a second intermediate structure comprising coarse and intermediate layers;
    d) applying to the second intermediate structure a suspension of third particles comprising a third metal or alloy in metallic state, the third particles having an average diameter of 50-150 nanometers and a third sintering temperature;
    e) drying the suspension of third particles to form a third particle layer borne on the second intermediate structure;
    f) pressing the third particle layer borne on the second intermediate structure together with the second intermediate structure to form a third intermediate structure; and
    g) sintering the third intermediate structure at a temperature less than the second sintering temperature to form a composite nanoporous metal membrane.

2. The method according to claim 1, wherein the second particles having an average diameter of 1-4 micrometers.

3. The method according to claim 1, wherein step f) comprises uniform orthogonal compression of the third particle layer.

4. The method according to claim 1, wherein the suspension of third particles is a suspension in a solvent system of one or more alcohols and/or water.

5. The method according to claim 1, wherein the suspension of third particles is a suspension in a solvent system having a surface tension of less than 30.0 millinewtons per meter at 20° C.

6. The method according to claim 1, wherein the composite nanoporous metal membrane has a bubble point of 207 kPa (30 PSI) or greater as measured by an IPA Bubble Point Test Method and an air permeability of 0.200 slpm/cm$^2$ or greater as measured by an Air Permeability Test Method.

7. The method according to claim 1, wherein the composite nanoporous metal membrane has a bubble point of 380 kPa (55 PSI) or greater as measured by an IPA Bubble Point Test Method.

8. The method according to claim 1, wherein the composite nanoporous metal membrane comprises pores capable of passing liquids or supercritical fluids.

9. The method according to claim 1, wherein the first, second, and third metals are independently selected from the group consisting of stainless steel and nickel.

* * * * *